United States Patent
Georgoulias et al.

(10) Patent No.: US 9,909,933 B2
(45) Date of Patent: Mar. 6, 2018

(54) EUTECTIC BASED CONTINUOUS THERMAL SENSING ELEMENT INCLUDING FIBER WRAPPED CENTER CONDUCTOR

(71) Applicant: Kidde Technologies Inc., Wilson, NC (US)

(72) Inventors: Chris George Georgoulias, Raleigh, NC (US); Doug John Baxendell, Clayton, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 649 days.

(21) Appl. No.: 14/564,664

(22) Filed: Dec. 9, 2014

(65) Prior Publication Data

US 2016/0161345 A1 Jun. 9, 2016

(51) Int. Cl.
*G01K 11/06* (2006.01)
*G01K 7/06* (2006.01)

(52) U.S. Cl.
CPC .............. *G01K 11/06* (2013.01); *G01K 7/06* (2013.01)

(58) Field of Classification Search
CPC . G01K 11/06; G01K 7/00; G01K 7/16; G01K 3/04; G01K 11/00; G01N 25/04; G01N 31/229
See application file for complete search history.

(56) References Cited

U.S. PATENT DOCUMENTS

| | | | | |
|---|---|---|---|---|
| 2,419,214 A | * | 4/1947 | Holman | G01K 13/06 219/155 |
| 2,610,286 A | * | 9/1952 | Cox | H05B 3/56 174/117 F |
| 2,732,479 A | * | 1/1956 | Usa | H05B 3/56 219/529 |
| 3,381,473 A | * | 5/1968 | Kuehl | C06B 33/00 149/5 |
| 3,743,986 A | * | 7/1973 | McInturff | H01B 12/10 174/125.1 |
| 3,818,412 A | * | 6/1974 | Deardurff | H01B 7/0063 156/52 |
| 4,435,692 A | * | 3/1984 | Miyamoto | H01B 7/0063 174/120 SC |

(Continued)

FOREIGN PATENT DOCUMENTS

| | | | |
|---|---|---|---|
| DE | 1621803 B | * | 3/1975 |
| FR | 2986777 A1 | | 8/2013 |

(Continued)

OTHER PUBLICATIONS

Extended European Search Report for corresponding EP Application No. 15198496.0-1555, dated Apr. 25, 2016, pp. 1-7.

*Primary Examiner* — Gail Kaplan Verbitsky
(74) *Attorney, Agent, or Firm* — Cantor Colburn LLP

(57) ABSTRACT

A eutectic sensing element includes an electrically conductive core extending along a first axis to define a length. The core is coated with a coated with a eutectic material formulated to provide desirable thermal response characteristics. The eutectic sensing element further includes an insulating fiber layer disposed on an external surface of the electrically conductive. The insulating fiber layer includes a strand that extends along the length of the electrically conductive core.

10 Claims, 3 Drawing Sheets

(56) References Cited

U.S. PATENT DOCUMENTS

| | | | | |
|---|---|---|---|---|
| 4,795,998 A | * | 1/1989 | Dunbar | G01L 1/205 |
| | | | | 338/208 |
| 4,800,359 A | * | 1/1989 | Yukawa | H01C 3/20 |
| | | | | 338/214 |
| 5,015,958 A | * | 5/1991 | Masia | G01M 3/045 |
| | | | | 174/11 R |
| 5,034,719 A | * | 7/1991 | Brown | H01B 7/0063 |
| | | | | 174/102 SC |
| 5,418,516 A | * | 5/1995 | Oh | H01H 85/048 |
| | | | | 338/21 |
| 2003/0210902 A1 | * | 11/2003 | Giamati | H01C 1/08 |
| | | | | 392/444 |
| 2010/0118911 A1 | * | 5/2010 | Lorrette | G01K 7/18 |
| | | | | 374/1 |

FOREIGN PATENT DOCUMENTS

| | | | | |
|---|---|---|---|---|
| GB | 839037 A | | 6/1960 | |
| GB | 2484990 A | | 5/2012 | |
| JP | 62229161 A | * | 10/1987 | G03G 9/1131 |
| JP | 2013237718 A | * | 11/2013 | |

* cited by examiner

EUTECTIC BASED CONTINUOUS THERMAL SENSING ELEMENT INCLUDING FIBER WRAPPED CENTER CONDUCTOR

TECHNICAL FIELD

The present invention relates generally to continuous sensing elements, and more particularly, to a continuous thermal sensing element including a fiber wrapped center conductor.

BACKGROUND

Eutectic based continuous thermal sensing elements are typically formed as a co-axial element including a center conductor such as a wire, for example. Current production methods for manufacturing continuous thermal sensing elements incorporate the application of tubular or crushed ceramic insulators as a means to isolate the center conductor from an outer covering or sheath. The tubular or crushed ceramic insulators, however, are susceptible to inconsistent and transient performance as the sensing element is manipulated and handled during processing and installation.

SUMMARY

According to a non-limiting embodiment, a eutectic sensing element includes an electrically conductive core extending along a first axis to define a length. The core is coated with a coated with a eutectic material formulated to provide desirable thermal response characteristics. The eutectic sensing element further includes an insulating fiber layer disposed on an external surface of the electrically conductive. The insulating fiber layer includes a strand that extends along the length of the electrically conductive core.

According to another non-limiting embodiment, a method of forming a eutectic sensing element comprises coupling a first fiber end of an insulating fiber strand to a first core end of an electrically conductive core. The method further includes wrapping the insulating fiber strand along a length of the electrically conductive core. The method further includes coupling a second end of the insulating fiber to a second core end of the electrically conductive core such that the insulating fiber forms a spiral-shaped insulating fiber layer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
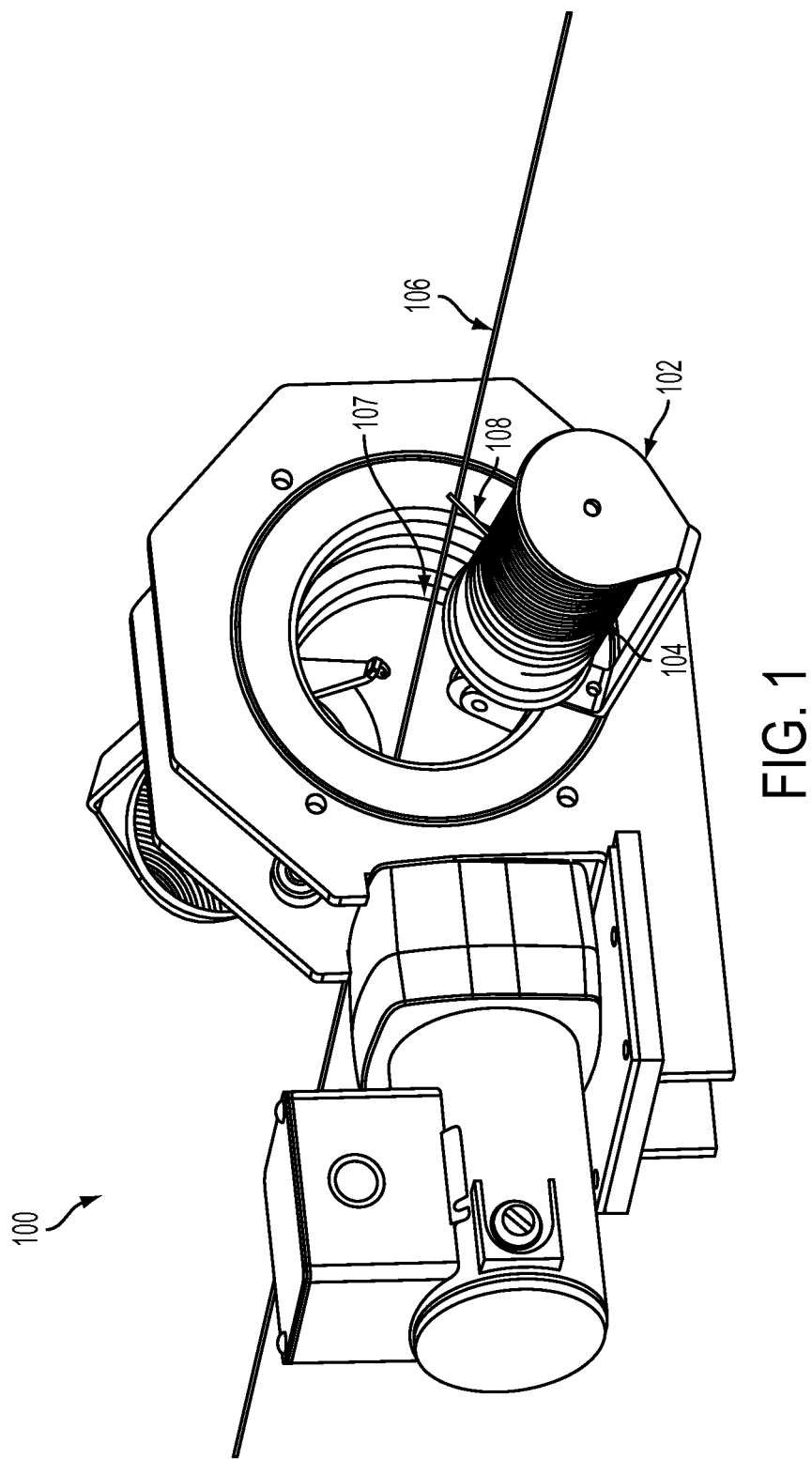
FIG. 1 illustrates a fiber wrapping apparatus configured to wrap an insulating fiber around an exterior surface of a core extending through a wrapping vicinity.

Referring to FIG. 1, a fiber wrapping apparatus 100 is illustrated according to a non-limiting embodiment. The fiber wrapping apparatus 100 includes a spool 102 loaded with insulating fiber wrapping 104 (i.e., a wound strand). The insulating fiber wrapping 104 may be formed from various insulating materials including, but not limited to, ceramic and glass. An electrically conductive core is coated with a eutectic material such as, a eutectic salt material for example, and is fed to a wrapping vicinity 107 to form a eutectic sensing element. According to an embodiment, the fiber wrapping apparatus 100 moves axially along the length of the core 106 while wrapping an insulating fiber strand 108 directly on the outer surface of the core 106. According to another embodiment, the wrapping apparatus 100 remains fixed and the fiber strand 108 is wrapped directly on to the outer surface of the core 106 as the core 106 is fed axially past the spool 102.

Figure 2:
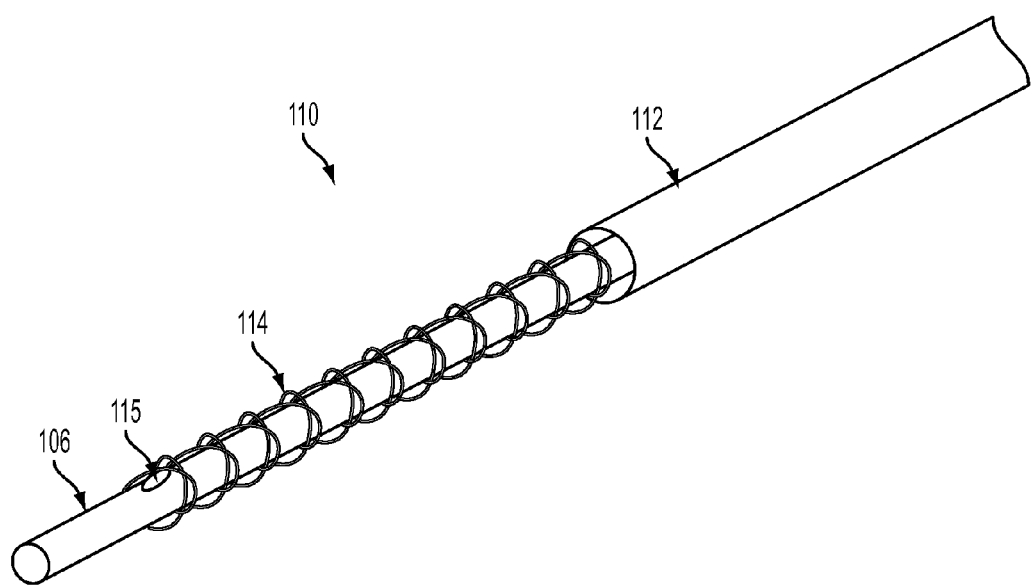
FIG. 2 illustrates a sensing element including a core disposed in a sheath, and an insulating fiber layer wrapped on an outer surface the core.

Turning now to FIG. 2, a continuous eutectic sensing element 110 is illustrated according to a non-limiting embodiment. The eutectic sensing element 110 includes a core 106, a sheath 112, and an insulating fiber layer 114. The core 106 can be formed of various high temperature conductive materials including, but not limited to, steel or nickel. The sheath 112 is formed from, for example, from a nickel-based alloy such as Inconel 625. The core 106 has a first diameter and the sheath 112 has a second diameter greater than the first diameter. Accordingly, the core 106 may disposed within the sheath 112. According to an embodiment, the sheath 112 comprises an electrically conductive material.

The insulating fiber layer 114 can be formed as a single strand or a matrix threading of an insulating material including, but not limited, to glass or ceramic. The insulating fiber layer 114 extends along the length of the core 106 and between an end of the sheath 112 and a contact terminal 115 formed at an end of the core 106. The sheath 112 may be disposed over the insulating fiber layer 114 and the core 106 coated with the eutectic material, to form a co-axial continuous eutectic sensing element 110. In this manner, the insulating fiber layer 114 isolates the core 106 from the sheath 112.

Figure 3:
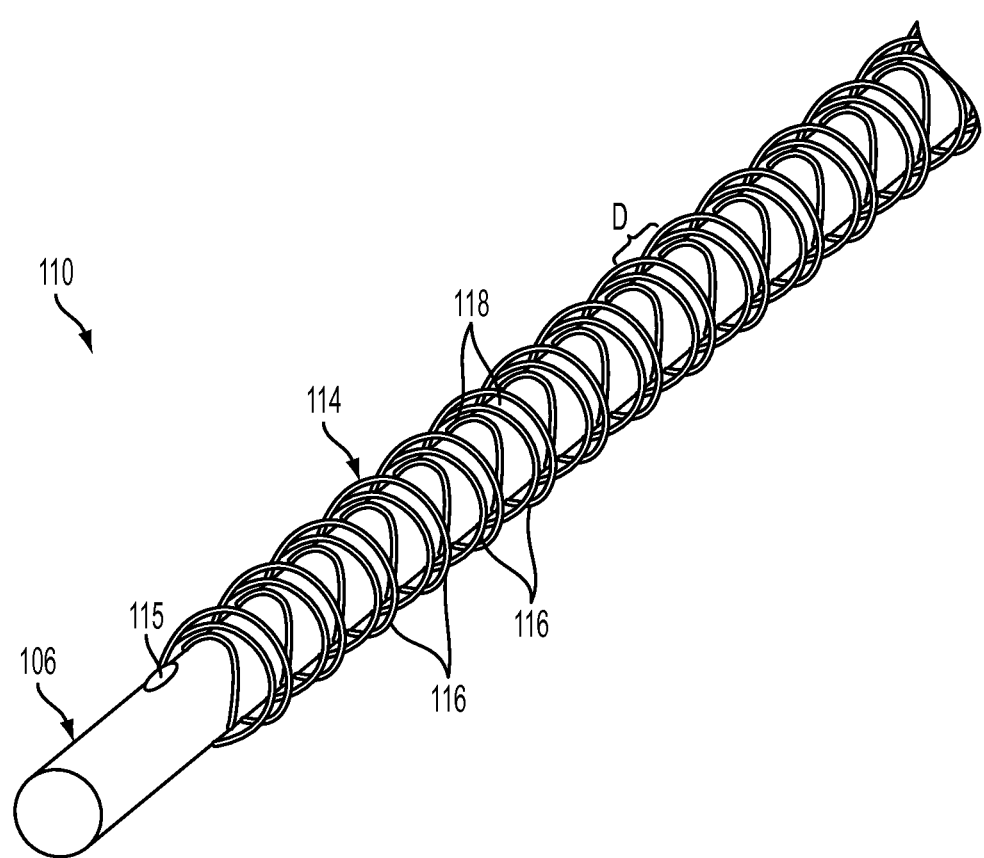
FIG. 3 is a close up view of a conductive core including an insulating fiber layer wrapped according to a spiral arrangement on an outer surface thereof to form a plurality of fiber segments that define gaps between each pair of fiber segments.

Referring to FIG. 3, a close up view of a core 106 included in a eutectic sensing element 110 is illustrated. The core 106 includes an insulating fiber layer 114 wrapped directly thereon. The insulating fiber layer 114 is wrapped in a spiral arrangement that forms a plurality of fiber segments 116 and defines gaps 118 between each pair of fiber segments 116. The distance of the gaps 118 can be varied based on how close together (i.e., how tight) each fiber segments 116 is wrapped on the core 106 with respect to one another. The distance of the gaps 118 (i.e., the distance between each fiber segments 116) may control the time constant of the eutectic sensing element 110, and may also control the consistency/sensitivity of the eutectic sensing element 110. For example, both the delay of the time constant and consistency/sensitivity may increase as the gap length, i.e., distances (d), decrease. Alternatively, the delay of the time constant and consistency/sensitivity decrease as the gap distances (d) increase. Further, the insulating performance provided by the insulating fiber layer 114 is Insulating performance is inversely related to gap distance. For example, the insulating performance increases or decreases as the distance (d) of the gaps 118 decrease or increase, respectively.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A eutectic sensing element, comprises:
    an electrically conductive core extending along a first axis to define a length; and
    an insulating fiber layer disposed on an external surface of the electrically conductive core, the insulating fiber layer including a strand that extends along the length of the electrically conductive core,
    wherein the electrically conductive core is coated with a eutectic material formulated to provide desirable thermal response characteristics, and the strand includes a plurality of fiber segments that define a plurality of gaps between each fiber segment, wherein a gap length of each gap controls a delay of a time constant of the eutectic sensing element.

2. The eutectic sensing element of claim 1, wherein a number of segments among the plurality of fiber segments controls insulating performance of the eutectic sensing element.

3. The eutectic sensing element of claim 2, wherein the strand comprises ceramic.

4. The eutectic sensing element of claim 2, wherein the strand comprises glass.

5. The eutectic sensing element of claim 2, further comprising a sheath surrounding the electrically conductive core, the insulating fiber layer interposed between the electrically conductive core and the sheath.

6. A method of forming a eutectic sensing element, the method comprising:
    coupling a first fiber end of an insulating fiber strand to a first core end of an electrically conductive core;
    wrapping the insulating fiber strand along a length of the electrically conductive core; and
    coupling a second end of the insulating fiber to a second core end of the electrically conductive core such that the insulating fiber forms a spiral-shaped insulating fiber layer;
    wherein the strand includes a plurality of fiber segments that define a plurality of gaps between each fiber segment, and wherein a gap length of each gap controls a delay of a time constant of the eutectic sensing element.

7. The method of claim 6, further comprising adjusting the insulating performance of the eutectic sensing element based on a number of segments among the plurality of fiber segments.

8. The method of claim 7, further comprising forming the strand from ceramic.

9. The method of claim 7, further comprising forming the strand from glass.

10. The method of claim 7, further comprising coating the electrically conductive core with a eutectic material and disposing a sheath around the electrically conductive core such that the insulating fiber layer is interposed between the electrically conductive core and the sheath.

* * * * *